US008379145B2

(12) United States Patent
Choi et al.

(10) Patent No.: US 8,379,145 B2
(45) Date of Patent: Feb. 19, 2013

(54) CONVERSION AND PROCESSING OF DEEP COLOR VIDEO IN A SINGLE CLOCK DOMAIN

(75) Inventors: Hoon Choi, Mountain View, CA (US); Daekyeung Kim, Palo Alto, CA (US); Wooseung Yang, Santa Clara, CA (US); Young Il Kim, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 13/217,138

(22) Filed: Aug. 24, 2011

(65) Prior Publication Data

US 2012/0188444 A1 Jul. 26, 2012

Related U.S. Application Data

(60) Provisional application No. 61/436,019, filed on Jan. 25, 2011.

(51) Int. Cl.
*H04N 7/01* (2006.01)
*H04N 11/20* (2006.01)
*H04N 9/76* (2006.01)

(52) U.S. Cl. ......................... 348/441; 348/453; 348/599

(58) Field of Classification Search .................. 348/441, 348/453, 447, 457–459, 464, 467, 563–566, 348/584, 586, 598, 599; *H04N 7/01, 11/20, H04N 5/445, 5/45, 9/74, 9/76*
See application file for complete search history.

(56) References Cited

U.S. PATENT DOCUMENTS

| | | | | |
|---|---|---|---|---|
| 7,034,887 | B2 * | 4/2006 | Jeffrey et al. | 348/447 |
| 7,705,915 | B1 * | 4/2010 | Lew et al. | 348/441 |
| 2002/0027515 | A1 | 3/2002 | Yoshifumi | |
| 2008/0122816 | A1 | 5/2008 | Park et al. | |

FOREIGN PATENT DOCUMENTS

JP 10-285132 10/1998

OTHER PUBLICATIONS

International Search Report and Written Opinion of the International Searching Authority mailed Aug. 24, 2012, in International Application No. PCT/US2012/020613, 7 pages.

* cited by examiner

*Primary Examiner* — Sherrie Hsia
(74) *Attorney, Agent, or Firm* — Blakely Sokoloff Taylor Zafman LLP

(57) ABSTRACT

Embodiments of the invention are generally directed to conversion and processing of deep color video in a single clock domain. An embodiment of a method includes receiving one or more video data streams, the one or more video data streams including a first video data stream, the first video data stream being clocked at a frequency of a link clock signal. The method further includes converting the first video data stream into a converted video data stream having a modified data format, wherein the modified data format includes transfer of a single pixel of data in one cycle of the link clock signal and the insertion of null data to fill empty cycles of the converted video data stream, and generation of a valid data signal to distinguish between valid video data and the null data in the converted video data stream. The method further includes processing the converted video data stream according to the frequency of the link clock signal to generate a processed data stream from the converted video data stream, wherein processing includes using the valid data signal to identify valid video data.

20 Claims, 13 Drawing Sheets

Color Depth Conversion (Dense to Sparse)

Color Depth Conversion (Sparse to Dense)

CONVERSION AND PROCESSING OF DEEP COLOR VIDEO IN A SINGLE CLOCK DOMAIN

RELATED APPLICATIONS

This application is related to and claims priority to U.S. Provisional Patent Application No. 61/436,019, filed Jan. 25, 2011, and such application is incorporated herein by reference.

TECHNICAL FIELD

Embodiments of the invention generally relate to the field of multimedia processing and, more particularly, conversion and processing of deep color video in a single clock domain.

BACKGROUND

In the processing and presentation of video data, there are numerous standards providing varying levels of color accuracy. High-definition video provides for greater density of colors and enhanced color accuracy. For example, 24-bit color is referred to as "truecolor", and provides 16.7 million colors. "Deep color" refers to a gamut comprising more than 16.7 million colors, and is generally 30-bit or greater (normally 30, 36, and 48-bit color).

However, the native format of deep color video data may be difficult to process directly. Therefore, color depth conversion for deep color is commonly performed before and after processing deep color video. Conventional color depth conversion methods need to generate a local clock domain, referred to as a "pixel clock", by using a phase locked loop (PLL). The use of a phase loop creates certain manufacturing and development costs, such as chip area requirements, power consumption, and circuit design/verification efforts.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
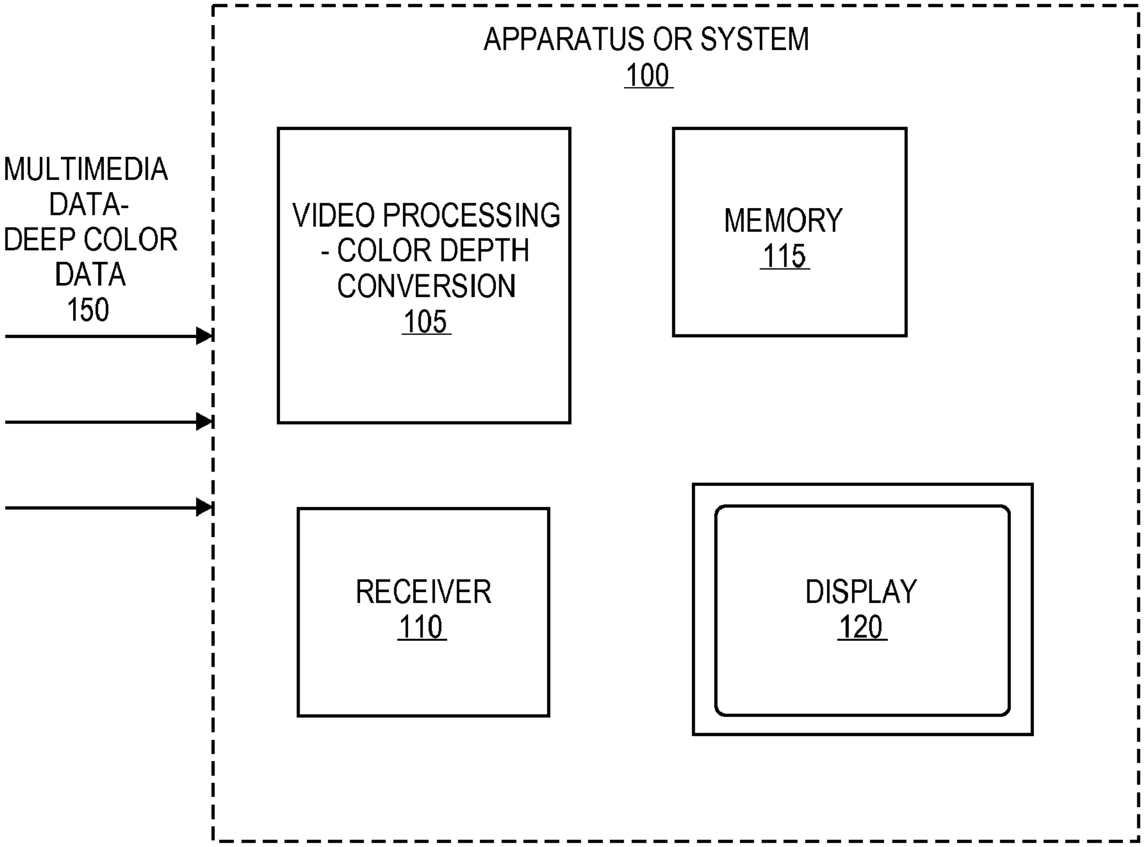
FIG. 1 illustrates an embodiment of a system for handling deep color video data.

Embodiments of the invention are generally directed to conversion and processing of deep color video in a single clock domain.

In a first aspect of the invention, a method includes receiving one or more video data streams, the one or more video data streams including a first video data stream, the first video data stream having a first color depth and being clocked at a frequency of a link clock signal. The method further includes converting the first video data stream into a converted video data stream having a modified data format, wherein the modified data format includes transfer of a single pixel of data in one cycle of the link clock signal and the insertion of null data to fill empty cycles of the converted video data stream, and generation of a valid data signal to distinguish between valid video data and the null data in the converted video data stream. The method further includes processing the converted video data stream according to the frequency of the link clock signal to generate a processed data stream from the converted video data stream, wherein processing includes using the valid data signal to identify valid video data.

In a second aspect of the invention, an apparatus includes a port for reception of a first video data stream, the first video data stream having a first color depth and being clocked at a link clock frequency. The apparatus further includes a conversion element, the conversion element to convert the first video data stream into a converted video data stream having a modified data format, wherein the modified data format includes transfer of a single pixel of data in one cycle of the link clock signal and the insertion of null data to fill empty cycles of the converted video data stream, and wherein the conversion element generates a valid data signal to distinguish between valid video data and the null data. The apparatus further includes a processing element to generate a processed data stream from the converted data stream, the processing element to process the converted video data stream according to the frequency of the link clock signal.

DETAILED DESCRIPTION

Embodiments of the invention are generally directed to conversion and processing of deep color video in a single clock domain.

In some embodiments, a method, apparatus, or system provides for the processing of deep color video in a single link clock domain, without generation of a local clock, or pixel clock, domain. In some embodiments, a method, apparatus, or system operates without requiring use of phase lock loop circuitry to generate a pixel clock.

There are several different color representations varying in the required bit width (or color depth) to store the color data of a pixel. In the 24-bit per pixel (bpp) representation of true color, color values for each pixel are encoded in a 24-bit per pixel fashion, where an 8-bit unsigned integer (with values 0 through 255) represents each of the intensities of red, green, and blue. This representation is the most common color interchange format in image file and video formats.

In contrast, deep color is a term that refers to the more enhanced representation of color than 24-bit true color representation. Deep color expands the colors on the display from millions to billions, which provides more vividness and color accuracy. For deep color, there are commonly used 30-, 36-, and 48-bit per pixel (bpp) deep color representations. In the 30-bit color representation, colors are stored in three 10-bits channels, resulting in 30 bits of color data per pixel. In 48-bit color representation, high-precision colors are stored in three 16-bit channels, resulting in 48 bits of color data per pixel.

In a conventional system, color depth conversion is commonly performed before and after processing deep color video, the local clock, or pixel clock, domain being generated using phase locked loop circuitry. In some embodiments, the conversion and processing of deep color video is accomplished in a single clock domain, utilizing a link clock domain. In some embodiments, conversion to and from deep color video and the processing of video data is accomplished in a link clock domain without requiring use of phase lock circuitry to generate a pixel clock domain. In some embodiments, a method, apparatus, or system converts received video data (which may be referred to herein as "dense video data" to indicate that such data contains video data without insertion of null data) to a modified "sparse video data" format, where sparse video data is video data that has been converted such that a pixel is transferred in one cycle of a link clock signal and such that null data is inserted to fill empty cycles of the link clock signal.

In some embodiments, a method, apparatus, or system is provided in a multimedia system such as an HDMI™ (High-Definition Multimedia Link) or MHL™ (Mobile High-Definition Link) system. However, embodiments are not limited to these link formats.

FIG. 1 illustrates an embodiment of a system for handling deep color video data. In this illustration, one or more multimedia data streams 150 may be received, where the data may include deep color video. The data streams 150 may be received by an apparatus or system 100 which may or may be not be combined in a unit. In some embodiments, the apparatus or system includes a video processing element 105, wherein the video processing element includes logic for color depth conversion prior to the video processing to simplify the processing of the video data. In some embodiments, the video processing element operates without a phase lock loop (PLL) to generate a local pixel clock domain, the conversion and processing being accomplished in the single link clock domain of the received video data.

In some embodiments, the apparatus or system includes other elements for the handling of the video data, including a receiver 110 for the reception of data, a memory 115 to buffer data as needed for processing and display, and a display element 120 for the display of processed video data.

Figure 2:
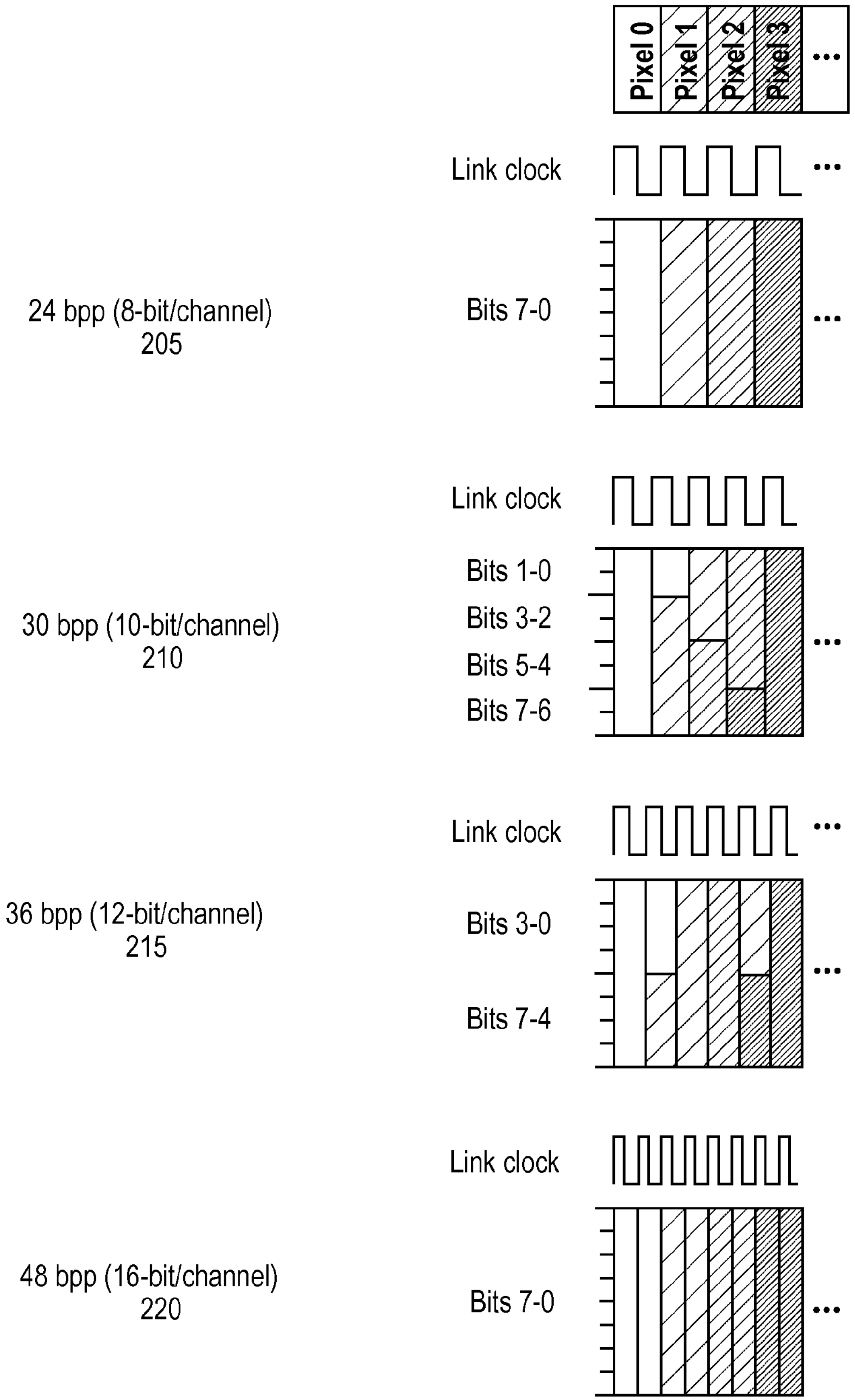
FIG. 2 is an illustration of timing diagrams for a link clock signal and data channel for deep color video data.

FIG. 2 is an illustration of timing diagrams for a link clock signal and data channel for deep color video data. In this illustration, a link clock signal and one data channel of various deep color modes are shown in circumstances when video data is transferred over a physical video data link such as HDMI. For a color depth of 24 bpp (bits per pixel) 205, pixels are transferred at a rate of one pixel per link clock cycle. For deep color depths 210-220 (30 bpp 210, 36 bpp 215, and 48 bpp 220), the link clock signal runs faster than the pixel clock in order to provide the extra bandwidth for the additional bits. In this illustration, the link clock rate is increased by the ratio of the pixel size to 24 bits.

For example, in the case of 36 bpp 210, the link clock frequency is 1.5 times higher than that of 24 bpp. For the video data path, the first 8-bit data of pixel 0 is transferred at the first link clock cycle and then the remaining 4-bit data of pixel 0 and the first 4-bit data of pixel 1 are packed together and transferred at the second link clock cycle.

For video data manipulation, there may be difficulties in providing an interface because the boundary between pixels in the data channel varies according to the time of sampling and the mode of deep color. In order to address this issue, conventional video processors convert a deep color interface (which is synchronized with a link clock signal) into a pixel clock domain in order to simplify next-stage video processing by a video processing core. The function of a video processing core stage depends on the main function of the system and may be any video processing task, such as picture in picture (PiP) processing, image enhancement, on-screen display (OSD), and others. After finishing the video processing, the output interface is conventionally converted back to the original link clock domain.

Figure 3:
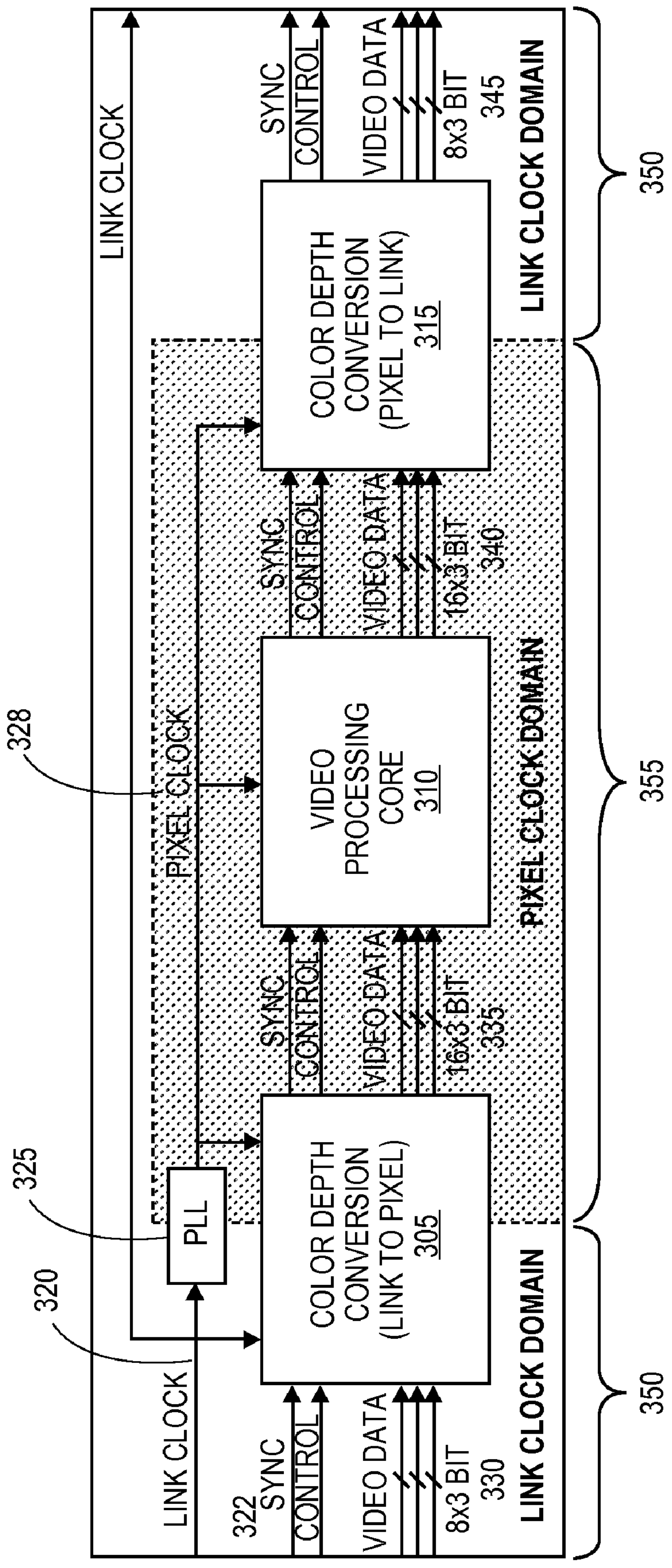
FIG. 3 illustrates a deep color conversion interface.

FIG. 3 illustrates a deep color conversion interface. In these illustrations, an example is provided for converting a 36-bpp deep color interface. In FIG. 3, video data is received via a source side video data bus 330, such data being received in a link clock domain 350 clocked by a link clock signal 320. Also illustrated are received sync and control signals 322. The video data is converted for processing in a pixel clock domain 355 clocked by a pixel clock signal 328, and is re-converted after processing to the link clock domain 350. In this illustration, a color depth conversion (link to pixel) module 305 operates to unpack a link-clock-domain deep color video (at a rate of a link clock signal 320) and to generate a pixel-clock-domain interface (at a rate of a pixel clock 328) in which pixels are transferred at a rate of one pixel per pixel clock. The pixel clock signal 328 can run slower than the link clock signal because the data bit width is bigger than that of link clock domain. The data is transferred via a video data bus 335 in the pixel clock domain 355 and received by a video processing core 310.

A PLL module 325 including phase lock loop circuitry is used to decrease the frequency of link clock signal 320 and generate the pixel clock signal 328, where the pixel clock rate is defined by the ratio of the pixel size to 24 bits. In this illustration, deep color video data source side video data bus 330 (illustrated as having three 8-bit data lines) is converted to provide video data to a video processing core 310 in a format to simplify video processing.

After completion of video processing by the video processing core 310, the processed data is transferred via video data bus 340 to a color depth conversion (pixel to link) module 315, which operates to pack the pixel-clock-domain deep color video and generate a link-clock-domain interface on a sink side video data bus 345 to provide compatibility with a sink device interface.

Figure 4:
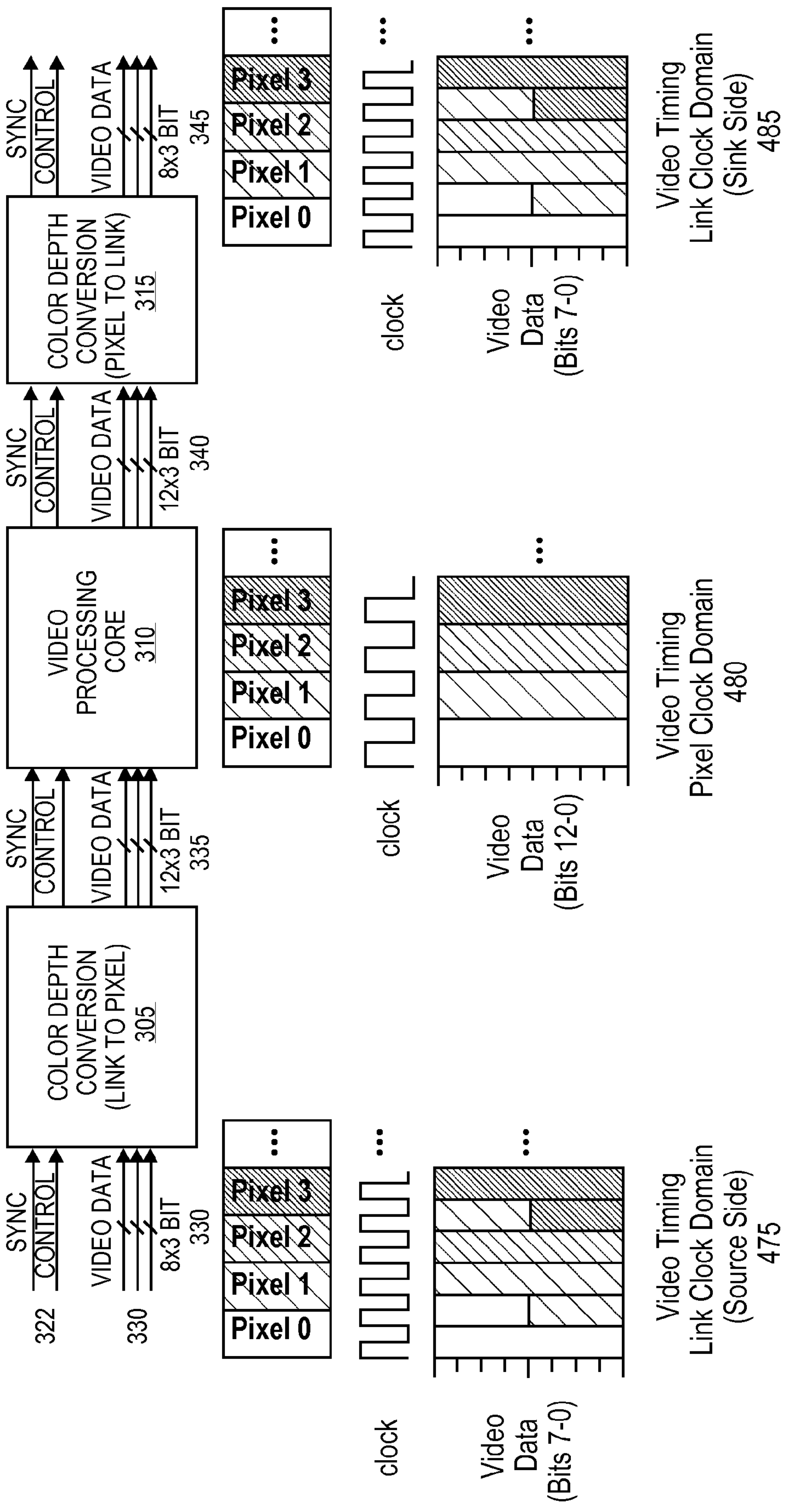
FIG. 4 illustrates video data timing of a deep color conversion interface.

FIG. 4 illustrates video data timing of a deep color conversion interface. FIG. 4 provides an illustration of the video data timing of the color conversion provided in FIG. 3. FIG. 4 again illustrates the source side video data bus 330 and sync and control signals 322, color depth conversion (link to pixel) module 305, video data bus 335, the video processing core 310, video data bus 340, the color depth conversion (pixel to link) module 315, and sink side video data bus 345. As shown in FIG. 4, the video data timing in the link clock domain on the source side 475 (showing video data bits 7-0) is converted by the color depth conversion module 305 to the aligned video data timing at the pixel clock domain 480, which is then re-converted by the color depth conversion module 315 to produce the video data timing at the link clock domain on the sink side 485.

Phase locked loop (PLL) circuitry is a circuitry that generates an output clock whose phase is related to the phase of an input reference clock signal. PLL is also used to synthesize a local clock with lower or higher frequency than the input reference clock. For conventional color depth conversion, PLL circuitry is used to generate a pixel clock signal with the desired frequency rate in relation to the input link clock signal.

However, PLL blocks pose design and verification challenges on most high-speed chips. Additionally, the cost of implementation of a PLL is significant. PLL blocks require large on-chip area and consume large amounts of power.

In some embodiments, a method, apparatus, or system provides for color conversion of deep color video data using a single clock domain, the link clock domain 350, and thus eliminates the need for the PLL module in generating clocking for the pixel clock domain 355.

Figure 5:
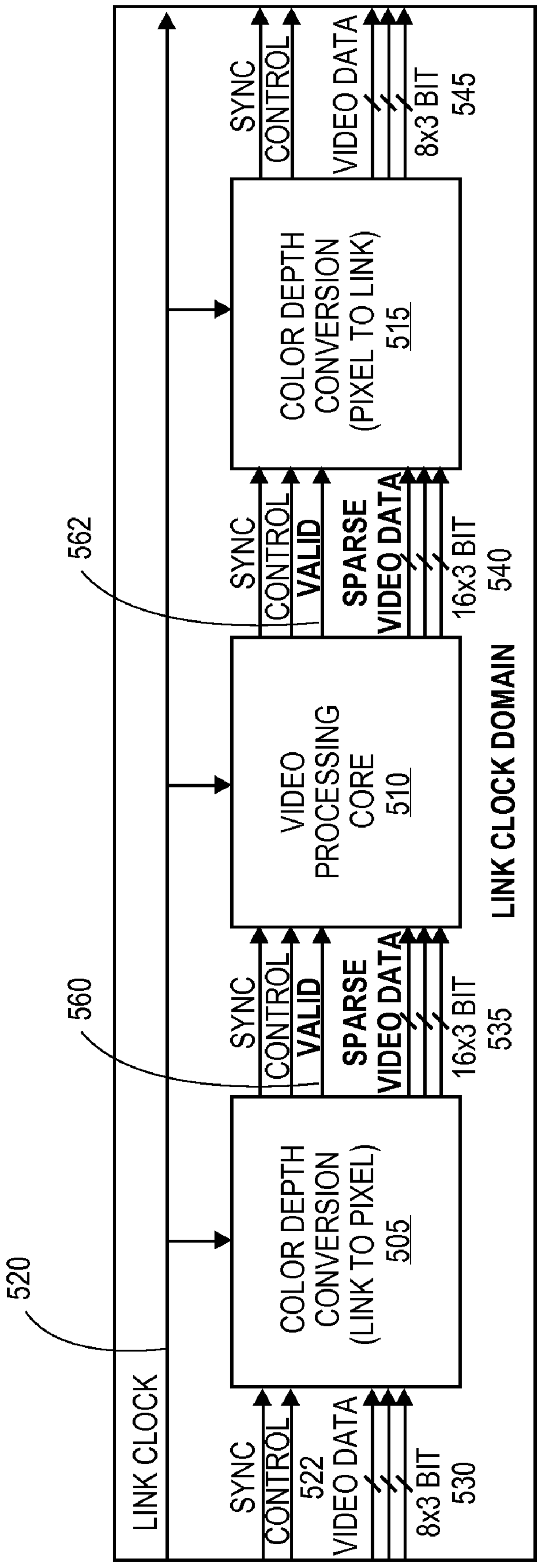
FIG. 5 illustrates an embodiment of processing deep color video with sparse video data.

FIG. 5 illustrates an embodiment of processing deep color video with sparse video data. In some embodiments, a method, apparatus, or system provides for video processing without use of a PLL module, and color depth conversion video data processing utilizes a single clock domain.

In this illustration, video data is received at a port on a source video data bus 530 from a source device, together with a link clock signal 520 and sync and control signals 522, the sync and control signals being transmitted between modules. In some embodiments, rather than generating a pixel clock signal, sparse video data is introduced on the data bus 535 by a color depth conversion module or element 505 in order to maintain the bandwidth of the deep color video data from a source. In some embodiments, a color depth conversion (dense to sparse) module 505 unpacks a link-clock-domain deep color video data stream, and generates a sparse video data interface in which pixels are transferred at the rate of one pixel per link clock cycle.

In some embodiments, a video processing core module or element 510 receives the sparse video data on the data bus 535 without modification of the clock frequency. In some embodiments, the video processing core module 510 receives the link clock signal 520, even though the data bit width has been increased. Therefore, the total data bandwidth of a sparse video data bus 535 is greater than the bandwidth of the source video data bus 530 receiving the video data. In some embodiments, null data is stuffed onto the sparse video data bus 535 according to the color depth conversion ratio of the color depth conversion module 505, the conversion ratio being the ratio between the pixel size of the video data and the bit width of the received video data. In some embodiments, a valid data signal 560 is turned off by the color depth conversion module 505 during periods when the video data has an interval with null data to identify video data and inserted null data.

In some embodiments, the video processing core module 510 utilizes the valid data signal 560 to distinguish between video data and inserted null data, and processes only the valid data. In some embodiments, the video processing core module 510 provides the processed video data via a sparse video data bus 540, together with a valid data signal 562 to identify processed video data and inserted null data.

In some embodiments, an additional color depth conversion (sparse to dense) module or element 515 receives the processed sparse video data and, utilizing the valid data signal 562 to distinguish between valid and null data, converts the processed sparse video data to dense video data to present on a sink side dense video data bus 545 in a format compatible with a sink device, such as a television or other presentation device.

Figure 6:
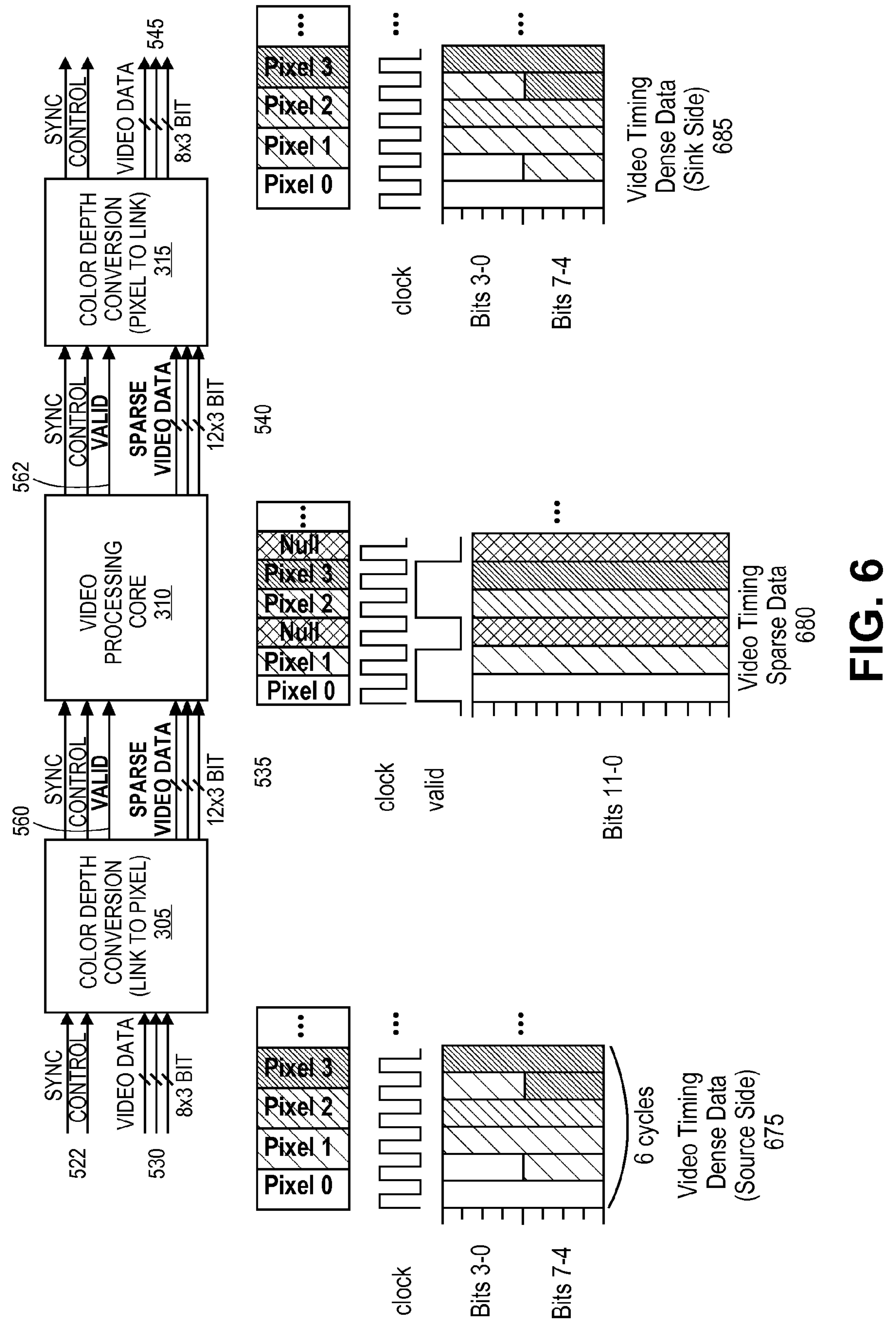
FIG. 6 illustrates video data timing of an embodiment of processing deep color video with sparse video data.

FIG. 6 illustrates video data timing of an embodiment of processing deep color video with sparse video data. FIG. 6 specifically provides an example of the method, apparatus, or system illustrated in FIG. 5 for the processing of 36-bpp (12-bit per channel) deep color. FIG. 6 again illustrates the source side dense video data bus 530 and sync and control signals 522, color depth conversion (dense to sparse) module 505, sparse video data bus 535 and valid data signal 560, the video processing core module utilizing sparse data 510, processed sparse video data bus 540 and valid data signal 562, the color depth conversion (sparse to dense) module 515, and sink side sparse video data bus 545. The bit width of the sparse video data bus 535 is bigger than the link video data bus 530 by the ratio of the pixel size to 24 bits. Thus, in the case of 36 bpp, the bit width of the source video data bus 530 is 8-bit per channel, while the bit width of the sparse video data bus 535 is 12-bit per channel. In this example, when a source transmits four pixels in six link clock cycles, as shown in the video data timing for dense data (source side) 675, the sparse video data bus 535 delivers the same amount of data for four link clock cycles. For the remaining two link clock cycles, null data is stuffed and the valid data signal 560 is de-asserted during the period as shown in the video data timing with sparse data 680.

In some embodiments, the video processing core module 510 includes control logic to detect a valid data signal, and utilizes such signal to sample only the valid portions of the sparse video data. In some embodiments, the overhead in providing such logic small when it is compared to PLL development and manufacturing costs such as chip area, power consumption, circuit design, and verification effort.

After completing video processing, the video processing core module 510 provides the converted video data via sparse video bus 540 to the color depth conversion (sparse to dense) module 515, which packs the sparse video data for transfer via the sink side dense video data bus 545, with the timing then returning to the format of the received data, as shown in the video data timing for dense video data (sink side) 685.

Figure 7:
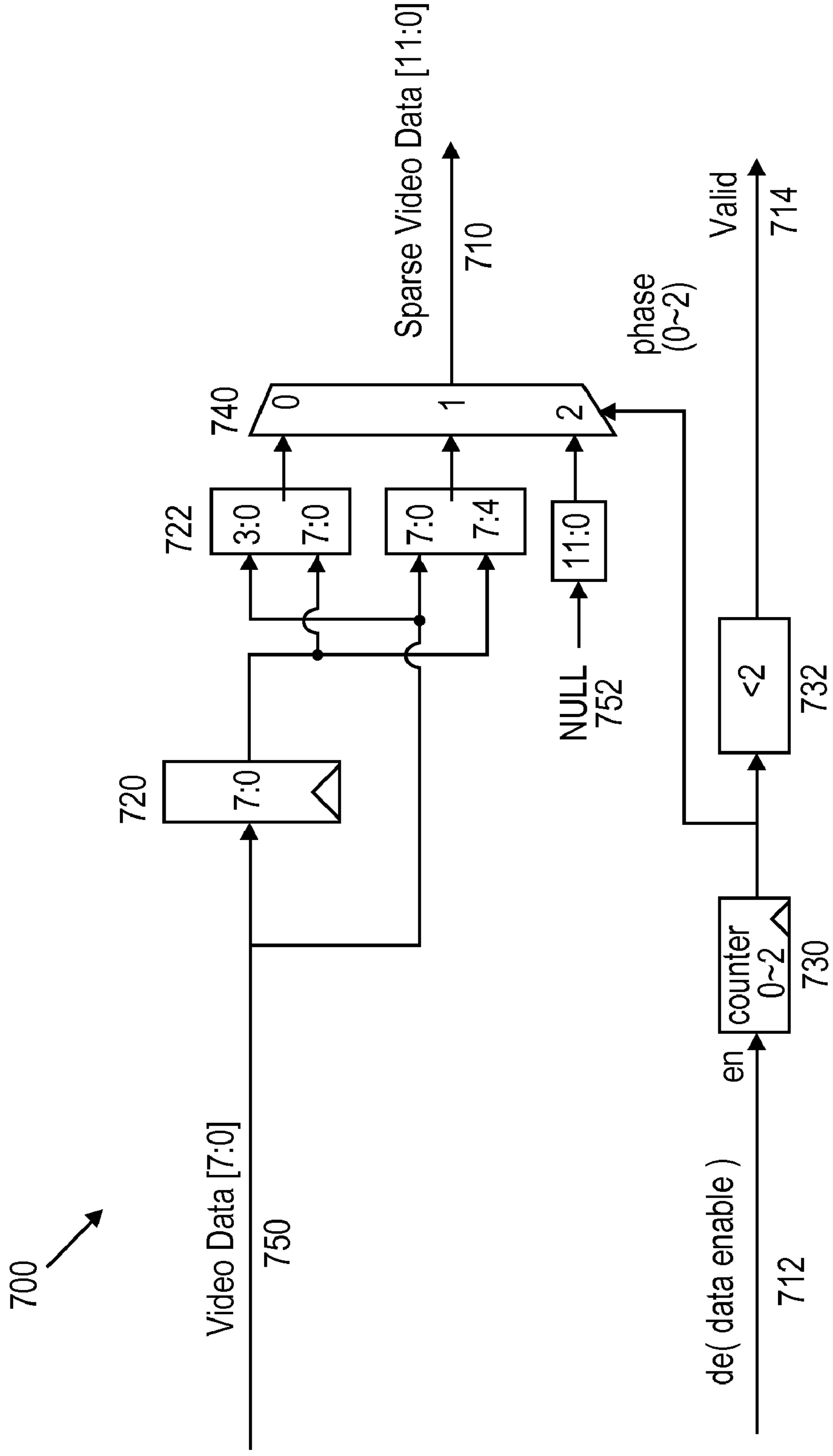
FIG. 7 illustrates an embodiment of a circuit to provide color depth conversion from dense data to sparse data.

FIG. 7 illustrates an embodiment of a circuit to provide color depth conversion from dense data to sparse data. FIG. 7 specifically provides an example of a color depth conversion (dense to sparse) module or element, such as element 505 of FIGS. 5 and 6. In this illustration, a circuit 700 receives deep color video data [7:0] 750. In some embodiments, three phases are rotating (0 through 2) at every link clock cycle via counter 730 during periods in which a "de" (data enable) signal 712 is high, the output being chosen by a multiplexer 740. According to a current phase, sparse video data is generated, in which one pixel is transferred per link clock cycle, wherein each data element is composed of a current part and a previous part of video data, as separated by latches 720 (to hold the 8 bits of a signal for a cycle) and 722 (to provide 8 bits of a delayed signal and 4 bits of a current signal in phase 0 and 4 bits of a delayed signal and 8 bits of a current signal in phase 1), and in which null data 752 is inserted for clock cycles in which there is no video data (phase 2).

Thus, for input ports, 8-bit video data 750 is received in every link clock cycle and a total of 24 bits of data is received for three link clock cycles. For output ports, 24-bit sparse video data is transmitted via a 12-bit sparse video data output bus 710 for two link clock cycles (0 and 1) and null 12-bit data 752 is transmitted for the other cycle (phase 2). In some embodiments, the 0 and 1 phases (i.e., phases having a value that is less than 2) are detected by an element 732 that generates a valid data signal 714, such that the valid data signal 714 is disabled when the null data is presented on the sparse data output bus 710.

Figure 8:
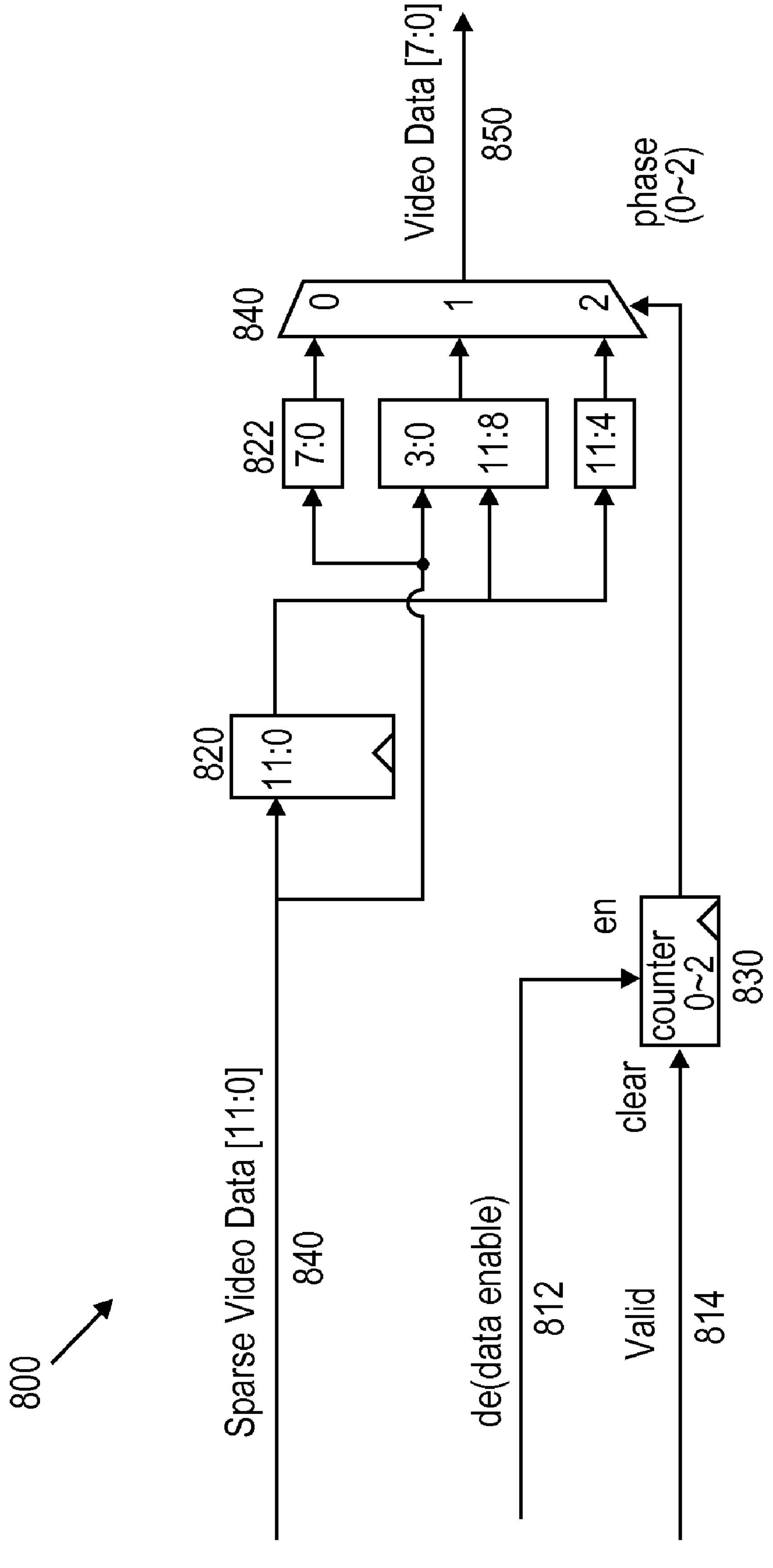
FIG. 8 illustrates an embodiment of a circuit to provide color depth conversion from sparse data to dense data.

FIG. 8 illustrates an embodiment of a circuit to provide color depth conversion from sparse data to dense data. FIG. 8 specifically provides an example of a color depth conversion (sparse to dense) module or element, such as element 515 of FIGS. 5 and 6. In some embodiments, a circuit 800 provides an inverse process of the dense to sparse color depth conversion illustrated in FIG. 7. In some embodiments, the circuit 800 receives sparse video data [11:0] 810, together with a de signal 812 and valid data signal 814, where the de signal 812 and the valid data signal 814 are received at counter 830 to count through phases 0~2 for multiplexer 840.

In some embodiments, valid data is received in phases 0 and 1, where latches 820 (holding 11 bits of a signal for a clock cycle) and 822 (to provide 8 bits of a current signal in phase 0, four bits of a delayed signal and four bits of a current signal in phase 1, and 8 bits of a current signal in phase 2). At phase 2, null data is received at the sparse video data port, but the data stored at latch 820 is used to generate the video data output in the phase. Thus, the null data contained in the sparse video data 810 is eliminated and is not included in the video data output 850, and the data is returned to dense video data form.

Figure 9:
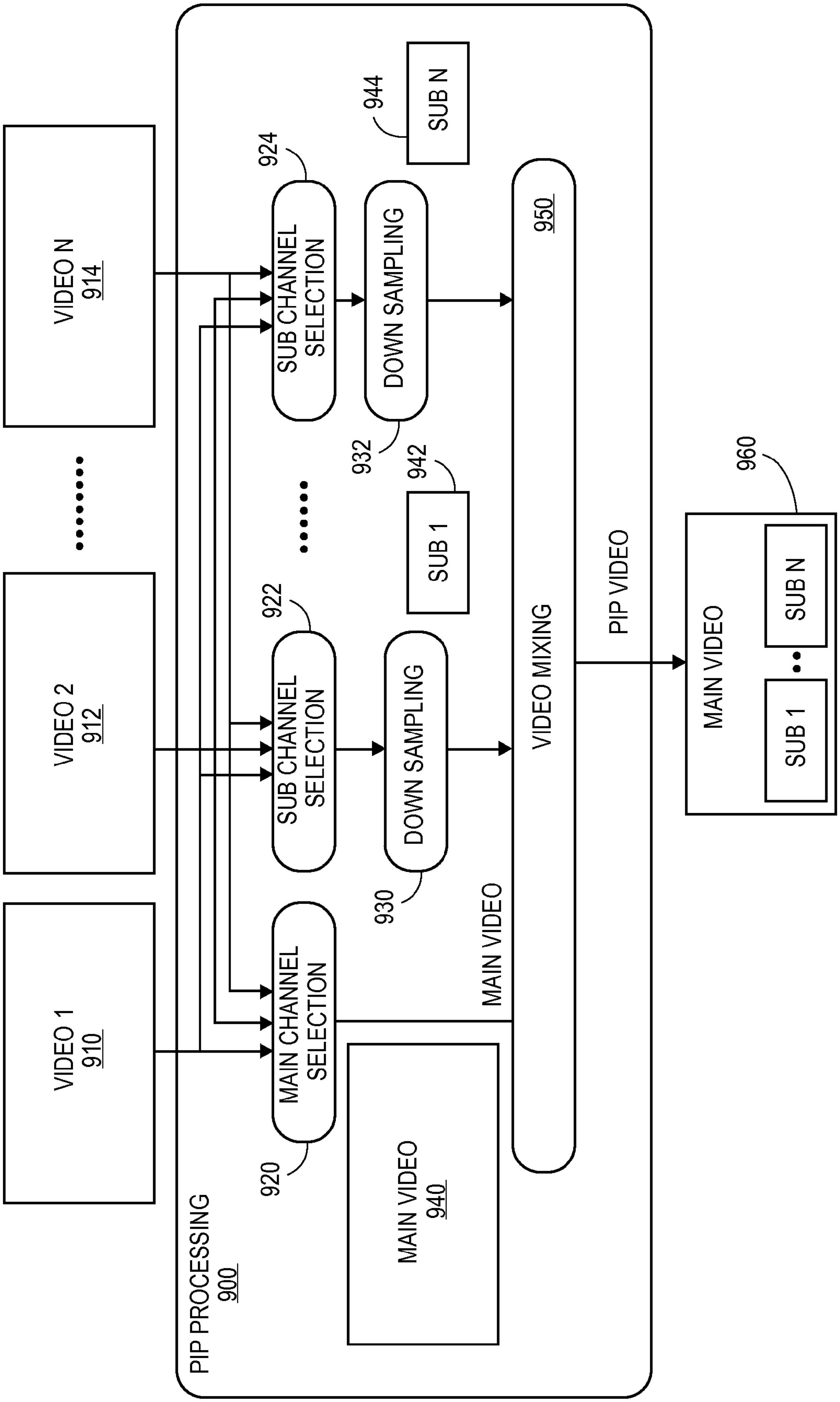
FIG. 9 is an illustration of the generation of a picture-in-picture (PiP) display.

FIG. 9 is an illustration of the generation of a picture-in-picture display. FIG. 9 illustrates a particular application example involving video processing. In some embodiments, conversion and processing in a single clock domain may be applied to this example. Picture-in-picture (PiP) is a feature of certain video transmitters and receivers for presentation on a television or other display. In this illustration, a PiP processing apparatus or system 900 may receive multiple video data streams, such as Video-1 910, Video-2 912, and continuing through Video-N 914. In such a system, a first channel, such as Video-1 in this illustration, is chosen by a main channel selection 920 to be the main video 940 for display on a full screen of the display. In addition, one or more other channels, such as Video-2 and Video-N, are chosen by subchannel selection 922 and 924 to be displayed in inset windows, the inset windows being superimposed on top of the first channel. The chosen sub channels are reduced in size, such as by down sampling 930 to generate sub video-1 942 and down sampling 932 to generate sub-video-N 944. The chosen videos are provided to video mixing 950 to produce the output video 960 composed of the main video and the down sized sub-videos superimposed on top of the main video.

Figure 10:
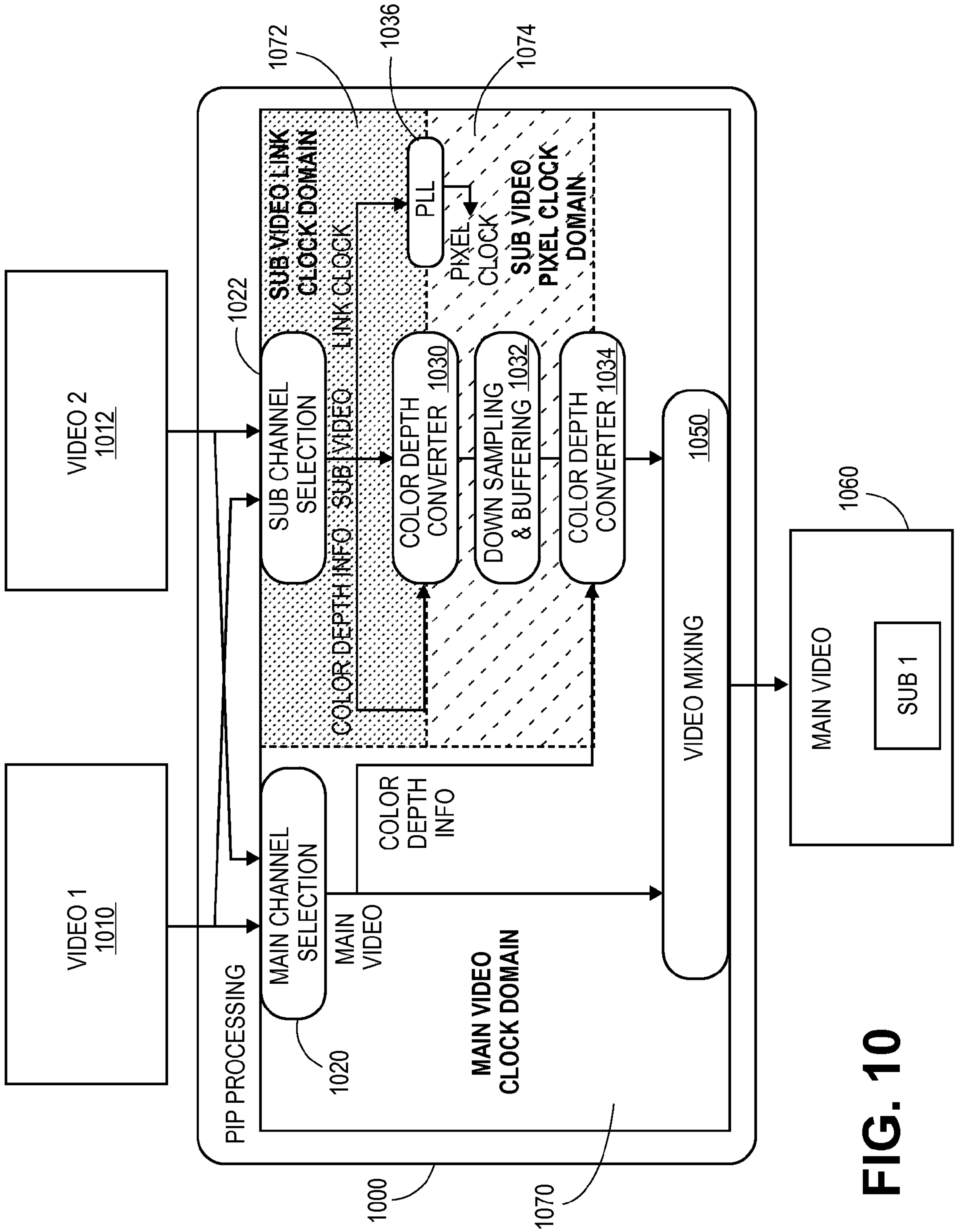
FIG. 10 illustrates an example of handling deep color video data for PiP video processing.

FIG. 10 illustrates an example of handling deep color video data for PiP video processing. In conventional processing of this example, multiple clock domains are required for conversion and processing of video data, which is further complicated by the mixing of video data that may arrive in varying formats. In some operations, incoming video ports may have different color representations. In order to perform down sampling and combine videos with different color formats, color depth conversion process is required for the PiP processing. In this illustration, the PiP processing 1000 may receive multiple incoming multimedia data streams, including Video-1 1010 and Video-2 1012. In this example, a main channel selection 1020 selects Video-1 as the main video and a sub-channel selection 1022 selects Video-2 as a sub-channel.

As shown, the main video is provided to video mixing 1050 in a main video clock domain 1070. In order to mix the main video with the sub video, the sub video will be required to be in the same clock domain. In this illustration, the sub video is received in the sub video clock domain 1072. The sub video data is received by an upper color depth converter 1030, which receives color depth information for the sub video. In a conventional apparatus or system, the upper color depth converter 1030 converts the format of the sub video into a pixel clock domain 1074 for ease of processing, such as down sampling and buffering 1032 in this example. A PLL module 1036 is used to generate a pixel clock signal from a link clock signal received with the sub video.

After completion of down sampling and buffering 1032, a lower color depth converter 1034, which has received color depth information for the main video, converts the format of the sub video into the same format as the main video for compatibility before merging with the main video by the video mixing 1050. The resulting video output 1060 is a PiP display composed of the main video and the sub video superimposed on top of the main video.

However, the chip size and power overhead required for PLL circuitry in a conventional apparatus or system creates cost and added complexity in manufacture. In addition, the PiP processing system requires three clock domains, the main clock domain 1070, the sub video link clock domain 1072, and the sub video pixel clock domain 1074, within the system. The use of multiple clock domains generally creates difficult logic design and verification issues. For simplicity in illustration, FIG. 10 shows a simple example of a PiP video processing apparatus or system that has only two video inputs. As the number of video input increases, the number of PLL and clock domains also increases, thereby further complicating the operation of a conventional apparatus or system.

In some embodiments, processing of PiP data may instead be provided utilizing a single domain channel for the processing of video data, where an apparatus or system may operate without requiring use of a PLL for the generation of a local pixel clock.

Figure 11:
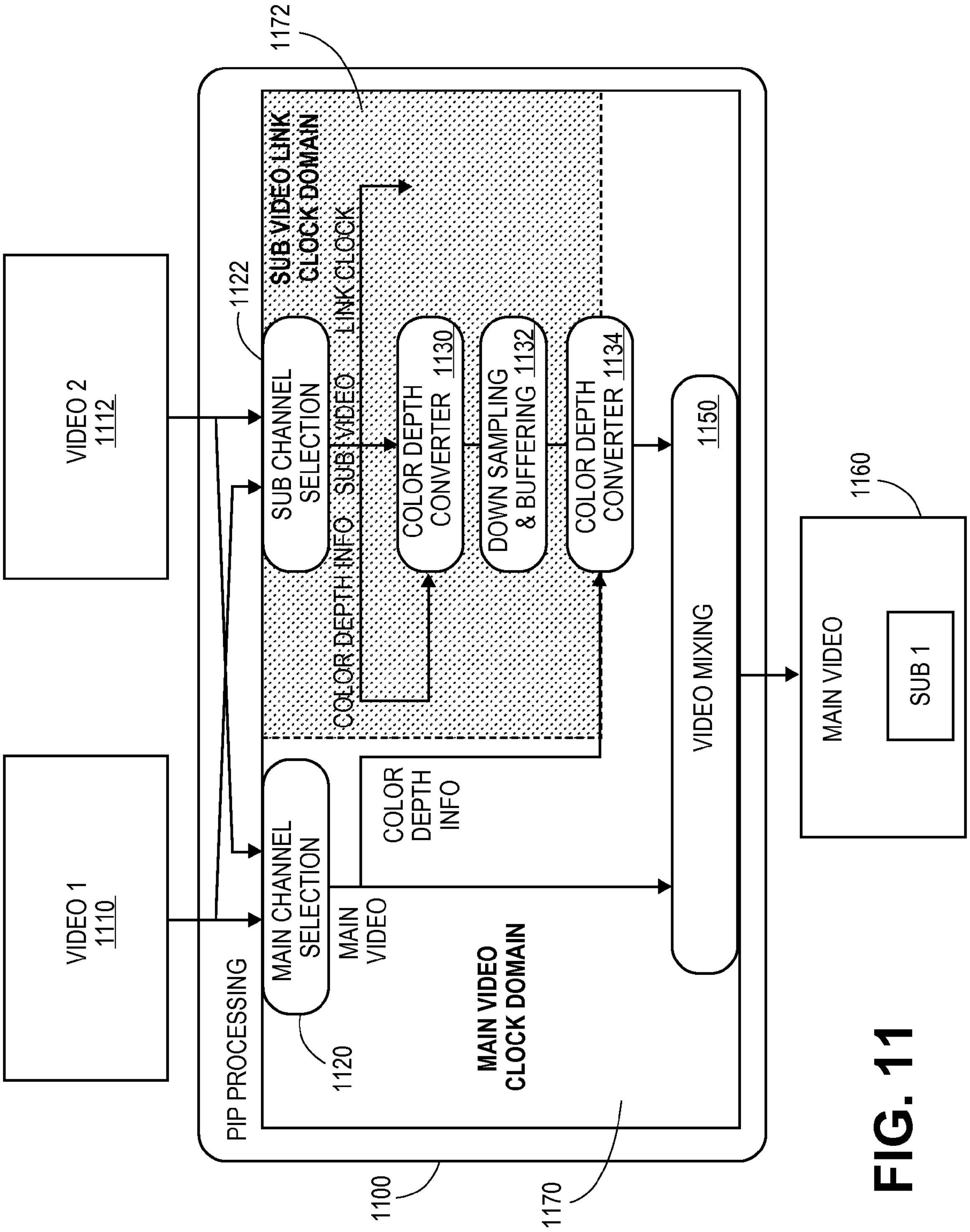
FIG. 11 illustrates an embodiment of an apparatus, system or process for handling the deep color video for PiP video processing.

FIG. 11 illustrates an embodiment of an apparatus, system or process for handling the deep color video for PiP video processing. In contrast with conventional systems, an embodiment does not require PLL circuitry to generate a pixel clock for video conversion and processing. In some embodiments, a PiP processing apparatus or system 1100 is operable to receive multiple multimedia data streams, including Video-1 1110 and Video-2 1112. Video 1 is selected by the main channel selection 1120 to be the main video and Video 2 is selected by sub channel selection 1122 to be the sub video. In some embodiments, the sub video is received in the sub video link clock domain 1172, and remains in such domain for video data conversion and PiP processing. In some embodiments, color depth information for the sub video is received by an upper color converter 1130.

In some embodiments, the upper color depth converter 1130 converts the format of the sub video into sparse video format, as shown in, for example, FIGS. 5 and 6, for ease of core video processing, wherein the sparse video data format provides for transferring one pixel of data in each link clock cycle and inserting null data to fill the empty cycles of the video data. In this example, video processing includes down sampling and buffering 1132 to convert the sub video into a reduced format. In some embodiments, the video processing (down sampling) module or element includes logic to interface with sparse video data by sampling a video data bus only when a valid data signal (such as valid data signal 560 in FIGS. 5 and 6) is asserted. In some embodiments, after down sampling and buffering 1132 is completed, a lower color depth converter 1134, which receives color depth information from the main video, converts the format of the processed sub video into the same deep color format as the main video for compatibility prior to the data being received by a video mixing module or element 1150. The video mixing module 1150 provides for merging the main video and the sub video to generate an output video display 1160, the output display including the main video and the sub video superimposed on top of the main video, the main video and sub video having the same color depth.

Figure 12:
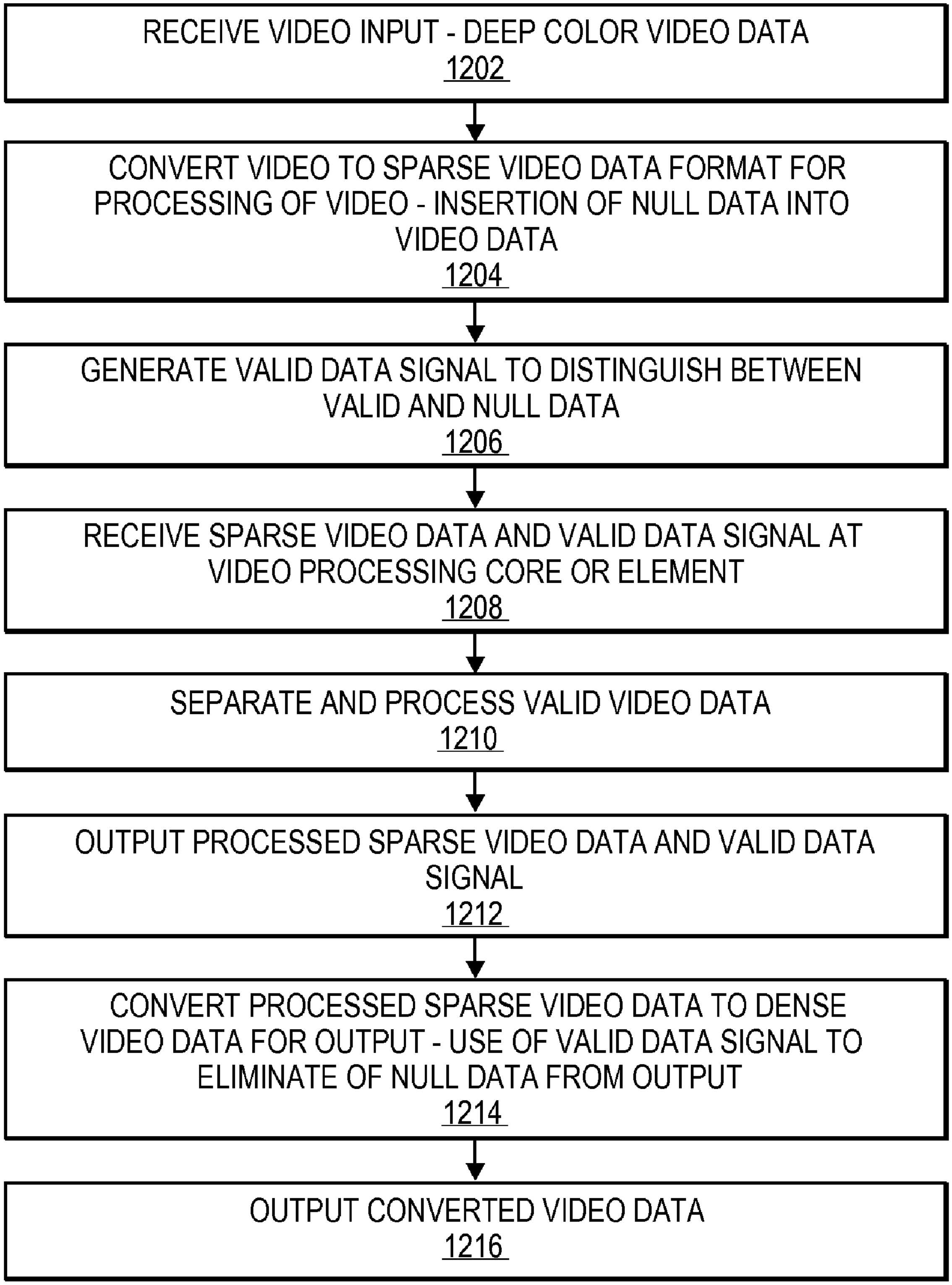
FIG. 12 is a flowchart to illustrate an embodiment of handling of deep color video data.

FIG. 12 is a flowchart to illustrate an embodiment of handling of deep color video data. In some embodiments, video data input is received, where the video data is deep color data 1202. In some embodiments, the received video data is converted to sparse video data for ease of processing of the data, where the conversion includes the insertion of null data into the video data 1204. The video data timing may be, for example, as illustrated in FIG. 6. In some embodiments, a valid data signal is generated to distinguish between valid video data and the inserted null data 1206.

In some embodiments, the sparse video data and the valid data signal is received at a video processing core or element 1208, where the valid data is separated and processed 1210, where the separation of the valid video data is based on the received valid data signal. In some embodiments, the video processing core or element outputs processed sparse video data and the valid data signal 1212.

In some embodiments, the processed sparse video data is converted to dense video data, including use of the valid data signal to distinguish and eliminate the null data 1214, and the converted video data is presented as an output 1216. In some embodiments, the depth of the resulting processed video data is the same as the input data, and in other embodiments, the depth of the processed video data is different from the depth of the input data, such as when the processed video data needs to match the depth of another video signal.

Figure 13:
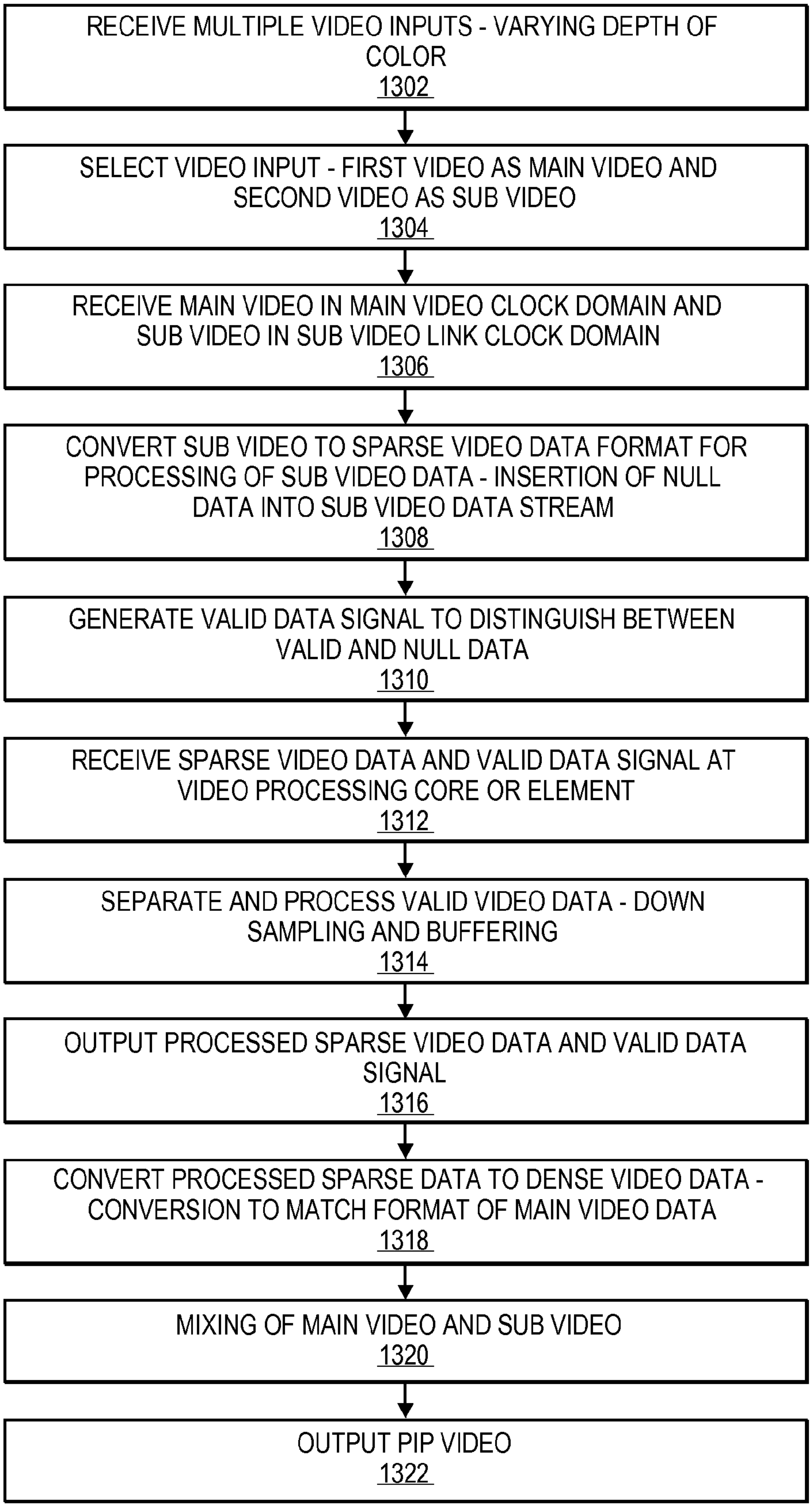
FIG. 13 is a flowchart to illustrate an embodiment of handling of deep color video data for a picture-in-picture display.

FIG. 13 is a flowchart to illustrate an embodiment of handling of deep color video data for a picture-in-picture display. FIG. 13 illustrates the handling of data in a particular application example, wherein multiple video streams are received for the purpose of mixing such streams to generate a PiP display. Other examples may utilize similar processing, including, for example, the receipt of multiple streams to generate a split screen (in which each image is reduced to fit a portion of a display screen).

In some embodiments, multiple video inputs are received 1302, where the video inputs may include varying color depths. A first video input is selected as a main video is selected as a sub video 1304. For simplicity of explanation, only a single sub video is described, but embodiments are not limited to the conversion and processing of any particular number of sub video data streams. In this example, the main video may have a first color depth and the second video may have a second color depth that may be different from the first color depth. In some embodiments, the main video is received in a main video clock domain and the second video is received in a sub video link clock domain 1306.

In some embodiments, the sub video is converted to a sparse video data format for the processing of the sub video data, where the conversion includes insertion of null data into the sub video data stream 1308. The video data timing may be, for example, as illustrated in FIG. 6. In some embodiments, a valid data signal is generated to distinguish between valid and null data 1310.

In some embodiments, the sparse video data and valid data signal are received at a video processing core or element 1312. The valid video data is separated from the sparse video data stream based on the valid data signal, and the valid video data is processed, including, for example, down sampling and buffering of the sub video 1314. In some embodiments, the processed sparse video data and valid video data signal are output from the video processing core or element 1316.

In some embodiments, the processed sparse video data is converted to dense video data, where the conversion includes use of the valid data signal to eliminate the null data, and where the conversion converts the video data to match the format of the main video 1318. The main video and the sub video are mixed 1320, resulting in the output of a PiP display 1322 containing the main video and the sub video in an inset window superimposed above the main video.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

The invention claimed is:

1. A method for processing data comprising:

receiving one or more video data streams, the one or more video data streams including a first video data stream, the first video data stream having a first color depth and being clocked at a frequency of a link clock signal;

converting the first video data stream into a converted video data stream having a modified data format, wherein the modified data format includes transfer of a single pixel of data in one cycle of the link clock signal and the insertion of null data to fill empty cycles of the converted video data stream;

generation of a valid data signal to distinguish between valid video data and the null data in the converted video data stream; and processing the converted video data stream according to the frequency of the link clock signal to generate a processed data stream from the converted video data stream, wherein processing includes using the valid data signal to identify valid video data.

2. The method of claim 1, wherein converting the first video data stream includes conversion of the format of the first video stream without generating a local pixel clock signal.

3. The method of claim 2, wherein converting the first video data stream includes conversion of the format of the first video stream without operation of a phase lock loop (PLL) element.

4. The method of claim 1, wherein the null data is inserted according to a ratio between a size of a pixel of the video data at the first color depth and a bit width of the first video data stream.

5. The method of claim 1, further comprising converting the processed data stream to an output data stream, wherein conversion includes removing the null data.

6. The method of claim 5, wherein converting the processed data stream includes converting the data to a format compatible with an apparatus receiving the output data stream.

7. The method of claim 5, wherein converting the processed data stream includes converting the data to a format to match a format of a second video data stream, and further comprising mixing the output data stream with the second video data stream.

8. An apparatus comprising:

a port for reception of a first video data stream, wherein the first video data stream has a first color depth and is clocked at a frequency of a link clock signal;

a conversion element, the conversion element to convert the first video data stream into a converted video data stream having a modified data format, wherein the modified data format includes transfer of a single pixel of data in one cycle of the link clock signal and the insertion of null data to fill empty cycles of the converted video data stream, and wherein the conversion element is to generate a valid data signal to distinguish between valid video data and the null data; and a processing element to generate a processed data stream from the converted data stream, the processing element to process the converted video data stream according to the frequency of the link clock signal.

9. The apparatus of claim 8, wherein the conversion element operates to convert the first video stream without generating a local clock signal.

10. The apparatus of claim 8, wherein the apparatus does not include a phase lock loop (PLL) to generate a clock signal.

11. The apparatus of claim 8, wherein the conversion element is to insert the null data according to a ratio between a size of a pixel of the video data at the first color depth and a bit width of the first video data stream.

12. The apparatus of claim 8, wherein the processing element includes logic to identify valid video data based on the valid data signal.

13. The apparatus of claim 8, further comprising a second conversion element to convert the processed data stream into an output data stream, wherein conversion of the processed data stream includes removing the null data from the output data stream.

14. The apparatus of claim 13, wherein the second conversion element converting the processed data stream includes the second conversion converting the data to a format compatible with an apparatus receiving the output data stream.

15. The apparatus of claim 13, further comprising a second port to receive a second video data stream, wherein the second conversion element converting the processed data stream includes converting the data to a format to match a format of the second video data stream, and further comprising a video mixer to mix the output data stream with the second video data stream.

16. A video data system comprising:

a first conversion element, the first conversion element to convert a first video data stream into a converted video data stream having a modified data format, wherein the modified data format includes transfer of a single pixel of data in one cycle of a link clock signal and the insertion of null data to fill empty cycles of the converted video data stream, and wherein the first conversion element is to generate a valid data signal to distinguish between valid video data and the null data;

a processing element to receive the converted video data stream and generate a processed data stream, the processing element to process the converted video data stream according to the frequency of the link clock signal, the processing element being operable to identify valid video data based on the valid data signal; and a second conversion element to convert the processed data stream into an output data stream, wherein conversion of the processed data stream includes removing the null data from the output data stream.

17. The system of claim 16, wherein the processing element provides the valid data signal to the second version element, and wherein removal of the null data from the output stream is based on the valid data signal.

18. The system of claim 16, wherein the system provides for conversion of the video data without generating a local clock pixel frequency.

19. The system of claim 18, wherein the system does not include a phase lock loop (PLL) circuit for the generation of a clock signal.

20. The system of claim 16, wherein the system provides the output to a sink device, and wherein conversion of the processed data stream includes conversion of the video data to a format compatible with the sink device.

* * * * *